Figure 1:
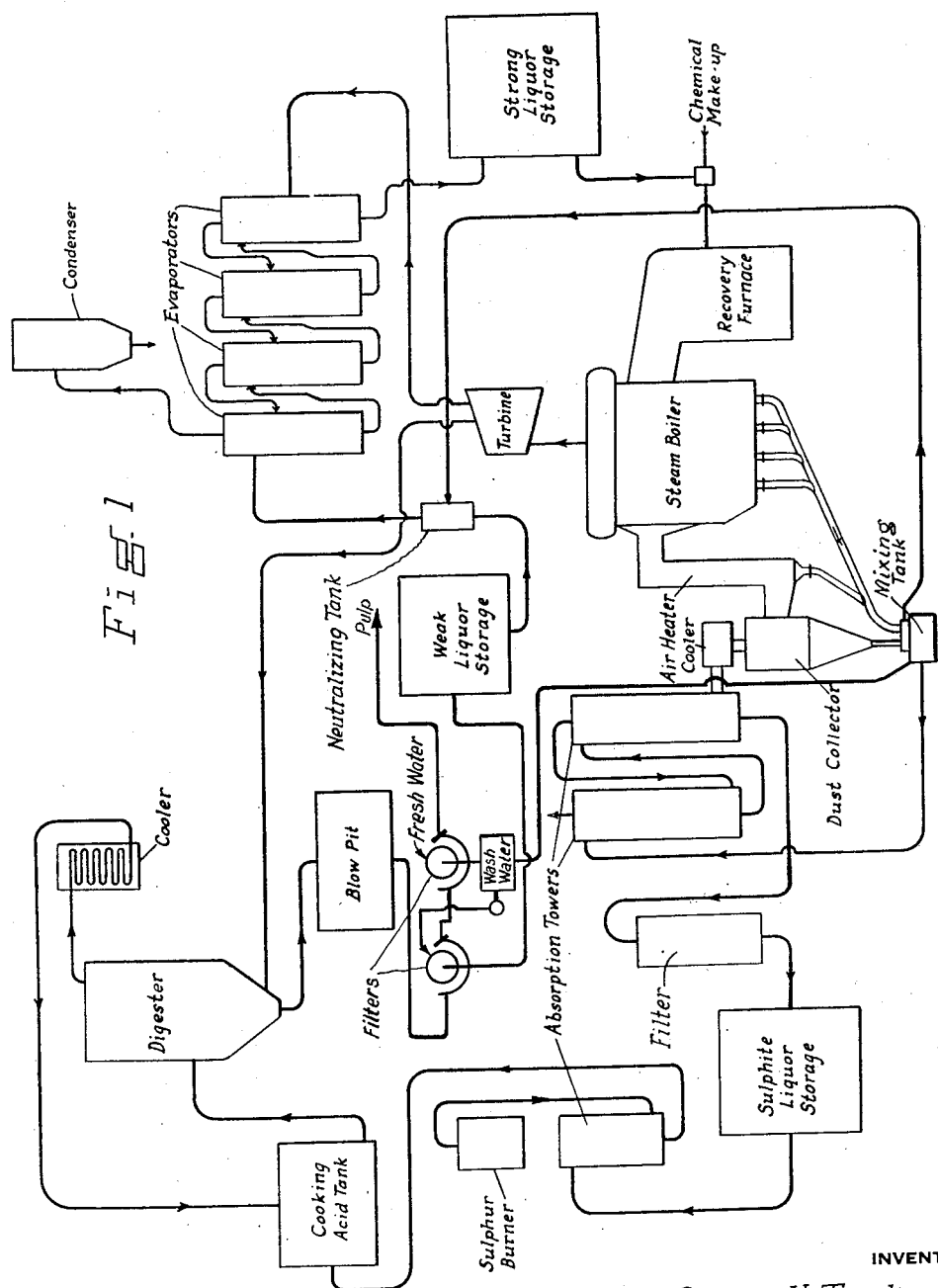

Patented Apr. 15, 1941

2,238,456

UNITED STATES PATENT OFFICE 2,238,456

PURIFICATION OF MAGNESIUM BASE LIQUORS

George H. Tomlinson, Westmount, Quebec, Canada

Application July 26, 1938, Serial No. 221,304

5 Claims. (Cl. 23—131)

The present invention relates in general to improvements in the manufacture of pulp from cellulosic fibrous material by the "acid" or "sulphite" process, and more particularly, to processes of the character described employing a magnesium base sulphite cooking liquor.

In my prior application Serial No. 186,938, filed Jan. 26, 1938, I have disclosed a cyclic process of and apparatus for manufacturing paper pulp in which a cooking liquor consisting of a pure acid sulphite compound of magnesium, i. e. magnesium bisulphite, with an excess of sulphur dioxide is supplied to the digester in the usual way. When the cooking operation is completed the residual liquor is separated from the pulp by means of suitable washing equipment, such as a plurality of rotary vacuum filters. The pulp residual liquor with its content of magnesium lignin sulphonate is then neutralized and delivered to a multiple effect evaporator, wherein it is evaporated to a substantially higher solid concentration, yet one suitable for spraying. The concentrated residual liquor is then introduced into a recovery furnace and burned under self-sustaining combustion conditions to yield a dry ash consisting mainly of caustic magnesium oxide (MgO) and including any other inorganic chemicals in the residual liquor. The ash is carried out of the furnace by flotation in the furnace gases through a heat recovery apparatus, such as a steam boiler, to a suitable ash separating and collecting device. The recovered ash is divided into two parts, one of which is mixed with the residue liquor prior to its evaporation for the purpose of neutralizing its acid content. By this step loss of sulphur during the evaporation step is eliminated, and any necessity for acid resisting material in the evaporator minimized. The other portion of the ash is mixed with water to form a slurry consisting mainly of MgO in suspension. The highly alkaline liquor so formed is supplied to a gas absorption tower in which it flows in contact with the flue gases from the ash separating apparatus for the purpose of recovering the sulphur dioxide content of the flue gases. The magnesia content of the liquor unites with the sulphur dioxide to form magnesium monosulphite or bisulphite. Not only are the sulphur constituents of the flue gases thus recovered in the absorption tower, but also any solids remaining in the gases. The acidified liquor is withdrawn from the gas absorption tower and passed through a suitable filter where any carbon particles present in the liquor are separated. The filtered liquor is delivered to a storage place, and is supplied as required to the cooking acid tank. Magnesia losses in the system are made up either by introducing magnesium sulphate into the residual liquor before its incineration or by adding magnesium carbonate or oxide to the ash. Sulphur dioxide may be added to maintain the sulphur balance before delivery of the sulphite liquor to the cooking acid tank. The sulphur dioxide gases released from the digester during the cooking operation are also introduced into the sulphite liquor, which is then ready to enter upon a fresh cycle.

Although wood is essentially an organic material, it is known to contain appreciable amounts of inorganic substances, particularly potassium, calcium, iron, and magnesium compounds. For example, the mean inorganic content of spruce wood expressed in parts per 10,000 parts of bone dry wood has been found to be:

| | |
|---|---|
| $K_2O$ | 7.8 |
| $Na_2O$ | 0.5 |
| $CaO$ | 6.5 |
| $MgO$ | 1.7 |
| $Fe_2O_3$ | 1.6 |
| $SiO_2$ | 0.6 |
| $P_2O_5$ | 1.5 |
| $SO_3$ | 1.0 |

With a magnesia base acid liquor, the MgO and $SO_3$ content would be beneficial. It is believed that the $P_2O_5$ and $SiO_2$ content will be retained in the pulp and can be ignored as to any effect on the residual liquor. I have found that the remaining inorganic materials dissolve in the cooking liquor and will be largely in solution in the residual liquor. With the described cyclic process these inorganic materials in the residual liquor would be recovered with the magnesium compounds in the ash and again used in the preparation of the cooking acid. During each cycle of acid preparation, cooking and recovery, a small amount of these materials would be added to the system so that their concentration relative to the magnesium concentration would tend to increase as the operation continues.

During the cooking operation various compounds including sulphates are formed in the digester. These sulphates in the presence of calcium form calcium sulphate. Calcium sulphate is particularly objectionable in residual liquor during its evaporation prior to its incineration as calcium sulphate will form an insoluble scale in the evaporator tubes, causing the evaporating capacity to be progressively decreased as the tube deposits increase. I have found that serious scale formation of this character will occur in the evaporators if the ratio of calcium to magnesium in the residual liquor is higher than one to ten, and even with such a ratio scale formation will be fairly rapid. The presence of calcium and other impurities in the residual liquor when supplied to the recovery furnace has been also found to disadvantageously affect the reactivity of the furnace ash. Calcium sulphate in the residual liquor supplied to the recovery furnace will be reduced to calcium sulphide (CaS). When calcium sulphide is treated with sulphurous acid, calcium sulphite is formed with the liberation of hydrogen sulphide ($H_2S$). The hydrogen sulphide reacts with the sulphur dioxide ($SO_2$) gas present, liberating colloidal sulphur, and colloidal sulphur when present in any quantity in the sulphite cooking acid has an objectionable effect upon the quality of the pulp produced.

A small amount of calcium and other impurities may also enter the cyclic system as impurities in the make-up magnesia if pure magnesia is not used. Another source of such impurities may be in any water supplied to the pulp washers and subsequently added to the residual liquor. Unless such impurities are removed from the cyclic system, their concentration would rapidly build-up and soon exceed the magnesium concentration.

The general object of my invention is the provision of a cyclic system of manufacturing paper pulp from cellulosic fibrous material in a magnesium base sulphite cooking liquor in which the concentration of inorganic impurities in the system is maintained relatively low with respect to the concentration of magnesium. A further object is the provision of an improved process of treating a magnesium base liquor, which includes the continuous removal of calcium and other inorganic impurities from the liquor.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter.

Figure 2:
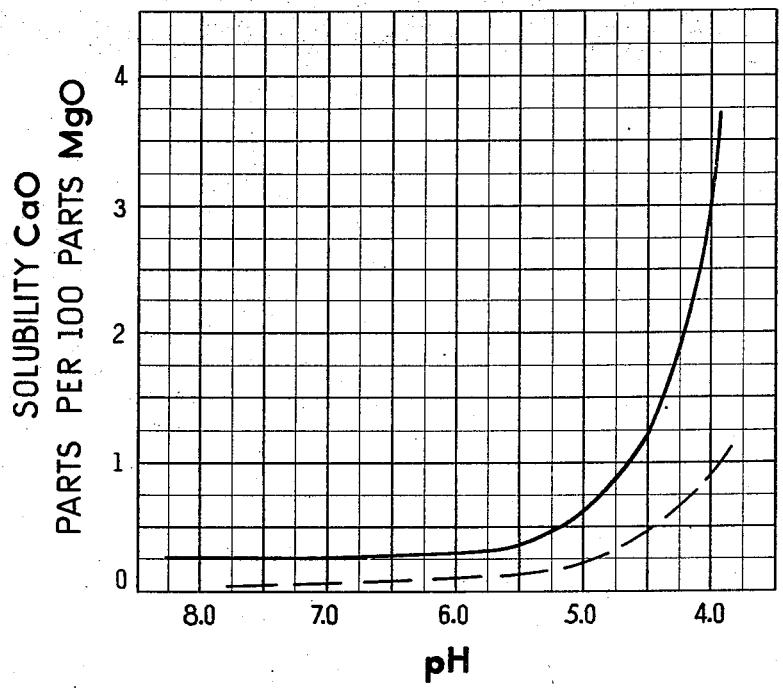

Of the drawings:

Fig. 1 is a diagrammatic flow sheet of a cyclic sulphite pulp manufacturing process similar to that disclosed in my said prior application, Serial No. 186,938, and for which my invention is especially designed; and Fig. 2 is a curve sheet illustrating the solubility of calcium oxide (CaO) in magnesia base sulphite acids.

In accordance with my invention the concentration of calcium and other impurities in the magnesium base acid cooking liquor is reduced during the residual liquor treatment cycle by maintaining the magnesium base liquor at least at one point in a condition facilitating the elimination of these impurities. In the preparation of fresh cooking acid from the recovery furnace ash containing the impurities to be eliminated, the ash is mixed with water to form a slurry of mainly magnesia and impurities in suspension, as described. Water from the pulp washers having a slight acid content is preferably used to decrease the chemical loss at the washers. The slurry is fed into the top of the $SO_2$ absorption towers through a conduit from the ash mixing tank.

The slurry passes down through the tower in counter-current relation to the relatively low temperature gases from the recovery furnace. During its passage through the tower the magnesia in suspension combines with the sulphur dioxide content of the gases and forms a solution of sulphited magnesium. The slurry fed to the towers is a liquor of high alkalinity, i. e. a liquor having a hydrogen ion concentration equivalent to a pH value of about 9.5, but as an increasing amount of sulphur dioxide is combined, the pH value rapidly falls. The natural temperature of the solution leaving the tower will be about 165° F.

Temperature changes of the solution have been found to exert little effect on pH values until relatively high acidities (a pH value less than 4.0) are reached. The relation between pH value and the ratio of total to combined $SO_2$ can be approximately determined.

Experiments have shown that when magnesia slurries having a magnesia content suitable for the preparation of cooking acid are sulphited, the sulphited magnesium will not go completely into solution until the pH has been reduced to 7.0. At lower pH values, the sulphited magnesium is completely dissolved. In experiments carried out at temperatures above 130° F., it was found that magnesium sulphite was precipitated from a liquor having a pH value of 8.8, a total $SO_2$ of 1.08% and combined $SO_2$ of 1.08%.

The solubility of sulphited calcium (expressed as CaO) in a sulphited magnesia liquor having a combined $SO_2$ value of 1.16% is shown in the curve in Fig. 2, the solid line showing the theoretical curve, while the broken line indicates the observed values. These curves show that the solubility is quite low until the pH value is reduced to 5.0 and then rapidly increases.

In accordance with my invention the pH value of the liquor in the absorption tower is maintained within the range in which the sulphited magnesium will have a high solubility, while the sulphited calcium and other inorganic impurities will be relatively insoluble. From experimental observations I have determined that the preferable range of pH values for the absorption tower liquor is between 4.0 and 7.0. The upper limit of the range is determined by the solubility of the magnesium compounds while the lower limit is determined by the solubility of the calcium compounds. Above this range some of the magnesia would remain in suspension and be separated from the liquor in the subsequent filtering operation. Below this range some of the impurities would go into solution in the liquor and increase the impurity concentration.

The pH value of the absorption tower liquor is preferably regulated by controlling the amount of recovered ash supplied to the absorption tower. This can be done either by maintaining a constant percentage of ash in the slurry and regulating the amount of slurry supplied to the absorption tower or by varying the percentage of ash in the slurry and maintaining the supply of slurry constant.

Under these controlled pH conditions substantially all of the calcium and other inorganic impurities in the slurry supplied to the $SO_2$ absorption tower remain in suspension in the liquor and the magnesium compounds rapidly go into solution. It was found that in the temperature range of 150–180° F., the solubility of sulphited calcium in magnesium base liquors would not exceed 0.7 part CaO per hundred parts MgO in any liquor having a combined $SO_2$ between 0.75% and 1.5% when the total $SO_2$ was in the range of 1.1 to 1.75 times the combined $SO_2$. It was also found that iron and alumina would be largely precipitated from all liquors within this range.

The impurities in suspension in the liquor leaving the $SO_2$ absorption tower are effectively removed in a suitable filter through which the liquor is passed on leaving the absorption tower, along with any carbon particles or other solids carried by the liquor. The relatively pure magnesium sulphite liquor is then delivered to the sulphite liquor storage tanks and after its total $SO_2$ has been regulated to the desired value, passed to the cooking acid tanks for reuse in the cooking operation in the digesters.

The described purification of the magnesium base liquor is a highly important step in maintaining an economic cyclic process of treating the pulp residual liquor for reuse of its chemical values. The particular mode of purification described is simple and highly effective and permits the use of the existing absorption tower and filtering apparatus of the plant, requiring only the addition of a small amount of pH measuring and control equipment.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. The method of treating magnesia base waste sulphite pulp liquor containing calcium impurities and combustible organic matter from a cyclic process for the manufacture of pulp by the digestion of cellulosic fibrous material which comprises burning the combustible organic matter of the liquor to obtain an ash consisting mainly of magnesium oxide together with calcium impurities, mixing the ash with water to produce an alkaline aqueous suspension consisting essentially of magnesium and calcium oxides, hydroxides and carbonates, subjecting the suspension to the action of sulphur dioxide, regulating the ratio of the ash and sulphur dioxide to control the pH value of the resultant mixture to a pH range of 4.0–7.0 in which the sulphited magnesium is highly soluble and the sulphited calcium is substantially insoluble, and separating the insoluble sulphited calcium.

2. The method of treating magnesia base waste sulphite pulp liquor containing calcium impurities and combustible organic matter from a cyclic process for the manufacture of pulp by the digestion of cellulosic fibrous material which comprises burning the combustible organic matter of the liquor to obtain an ash consisting mainly of magnesium oxide together with calcium impurities and combustion gases containing sulphur dioxide, mixing the ash with water to produce an alkaline aqueous supension consisting essentially of magnesium and calcium oxides, hydroxides and carbonates, subjecting the suspension to the action of the combustion gases containing sulphur dioxide, regulating the ratio of the ash and sulphur dioxide to control the pH value of the resultant mixture to a pH range of 4.0–7.0 in which the sulphited magnesium is highly soluble and the sulphited calcium is substantially insoluble, and filtering the mixture to separate the insoluble sulphited calcium.

3. The method of treating magnesia base waste sulphite pulp liquor containing calcium impurities and combustible organic matter from a cyclic process for the manufacture of pulp by the digestion of cellulosic fibrous material which comprises burning the combustible organic matter of the liquor to obtain an ash consisting mainly of magnesium oxide together with calcium impurities and combustion gases containing sulphur dioxide, mixing the ash with water to produce an alkaline aqueous suspension consisting essentially of magnesium and calcium oxides, hydroxides and carbonates, passing the ash suspenion through a gas absorption chamber in contact with the combustion gases containing sulphur dioxide, regulating the supply of the ash suspension to the gas absorption chamber to control the pH value of the resultant mixture to a pH range of 4.0–7.0 in which the sulphited magnesium is highly soluble and the sulphited calcium is substantially insoluble, and separating the insoluble sulphited calcium.

4. The method of treating magnesia base waste sulphite pulp liquor containing calcium impurities from a cyclic process for the manufacture of pulp by the digestion of cellulosic fibrous material which comprises concentrating the waste liquor, dehydrating and burning the concentrated liquor under self-sustaining combustion conditions to obtain an ash consisting mainly of magnesium oxide together with calcium impurities and combustion gases containing sulphur dioxide, mixing the ash with water to produce an alkaline aqueous suspension consisting essentially of magnesium and calcium oxides, hydroxides and carbonates, passing the ash suspension through a gas absorption chamber in contact with the combustion gases containing sulphur dioxide, regulating the ratio of the ash and sulphur dioxide to control the pH value of the resultant mixture to a pH range of 4.0–7.0 in which the sulphited magnesium is highly soluble and the sulphited calcium is substantially insoluble, and filtering the mixture to separate the insoluble sulphited calcium.

5. In the method of making pulp by the digestion of cellulosic fibrous material in a relatively pure magnesia base sulphite pulp cooking liquor with the recovery of the magnesia base from the waste liquor, the steps which comprise producing an alkaline aqueous suspension consisting essentially of a compound selected from the group consisting of magnesium oxide, hydroxide and carbonate and containing calcium impurities, subjecting the suspension to the action of sulphur dioxide, regulating the ratio of the suspension and sulphur dioxide to control the pH value of the resultant mixture to a pH range of 4.0–7.0 in which the sulphited magnesium is highly soluble and the sulphited calcium is substantially insoluble, separating the insoluble sulphited calcium, and further sulphiting the sulphited magnesium to a strength suitable for cooking liquor.

GEORGE H. TOMLINSON.